(12) United States Patent
Thumma et al.

(10) Patent No.: US 12,470,598 B2
(45) Date of Patent: Nov. 11, 2025

(54) BROWSER IMPERSONATOR DETECTION (BID) SYSTEM

(71) Applicant: Akamai Technologies, Inc., Cambridge, MA (US)

(72) Inventors: Srinivasa Thumma, Ashburn, VA (US); Anil Vaddi, Aurora, CO (US); Ankush Patankar, Guelph (CA); Mahalingaiah Rangaswamaiah, Bangalore (IN); Ixit Shah, Bangalore (IN); Dimpy Joshi, Tiruppur (IN)

(73) Assignee: Akamai Technologies, Inc., Cambridge, MA (US)

( * ) Notice: Subject to any disclaimer, the term of this patent is extended or adjusted under 35 U.S.C. 154(b) by 105 days.

(21) Appl. No.: 18/430,779

(22) Filed: Feb. 2, 2024

(65) Prior Publication Data
US 2025/0254195 A1    Aug. 7, 2025

(51) Int. Cl.
*H04L 9/40*        (2022.01)

(52) U.S. Cl.
CPC ...... *H04L 63/1483* (2013.01); *H04L 63/1425* (2013.01); *H04L 2463/144* (2013.01)

(58) Field of Classification Search
CPC ............. H04L 63/1483; H04L 63/1425; H04L 2463/144
See application file for complete search history.

(56) References Cited

U.S. PATENT DOCUMENTS

| | | | |
|---|---|---|---|
| 8,806,646 B1 | 8/2014 | Daswani et al. | |
| 9,906,544 B1 * | 2/2018 | Kurupati | H04L 63/1416 |
| 10,587,629 B1 * | 3/2020 | Kurupati | H04L 63/1408 |
| 10,686,818 B2 * | 6/2020 | Kurupati | H04L 63/1425 |
| 10,708,281 B1 | 7/2020 | Modalavalasa | |
| 11,245,722 B1 | 2/2022 | Senecal et al. | |
| 11,368,483 B1 | 6/2022 | Senecal et al. | |
| 11,374,945 B1 | 6/2022 | Senecal et al. | |
| 11,870,804 B2 | 1/2024 | Kurupati | |
| 12,164,644 B2 | 12/2024 | Hod et al. | |

(Continued)

FOREIGN PATENT DOCUMENTS

KR        1020220078320 A        6/2022

OTHER PUBLICATIONS

PCT/US25/14262, International Search Report and Written Opinion, mailed May 29, 2025.

*Primary Examiner* — Azizul Choudhury
(74) *Attorney, Agent, or Firm* — David H. Judson

(57) ABSTRACT

A bot detection service associated with an overlay network and configured as a centralized control plane, and a data plane that operates in an overlay network entity, e.g., an edge server. The control plane performs analytics continuously to generate a machine learning (ML) model, a set of device anomaly (DAN) patterns, and false positive (FP) tuning data. During a request processing workflow at the edge server, a request is received. A subset of detector rules triggered by the request are identified, optionally using the DAN patterns. The ML model is then applied to the subset to classify the request as a bot or human. When the request is classified as a bot, the FP tuning data is applied to determine whether to selectively override the classification as being a false positive. When the request is classified as a bot and not overridden, an action is taken, e.g., denying the request.

15 Claims, 5 Drawing Sheets

(56) References Cited

U.S. PATENT DOCUMENTS

| | | |
|---|---|---|
| 12,255,916 B2 | 3/2025 | Costa et al. |
| 12,316,672 B2 | 5/2025 | Senecal et al. |
| 12,341,808 B1 | 6/2025 | Thomas et al. |
| 2018/0167412 A1 | 6/2018 | Barrett et al. |
| 2019/0141057 A1 | 5/2019 | Burgis |
| 2019/0166141 A1* | 5/2019 | Xu .................. G06N 3/047 |
| 2020/0252428 A1 | 8/2020 | Gardezi et al. |
| 2021/0226987 A1 | 7/2021 | Summers et al. |
| 2022/0141252 A1 | 5/2022 | Shi |
| 2022/0174092 A1 | 6/2022 | Farjon et al. |
| 2022/0191241 A1 | 6/2022 | Vera-Schockner |
| 2023/0199023 A1 | 6/2023 | Kurupati |
| 2023/0224327 A1 | 7/2023 | Haworth et al. |
| 2023/0336571 A1 | 10/2023 | Costa et al. |

\* cited by examiner

| RULE ID | BOT CATEGORY | DESCRIPTION | APPROACH | ANOMALY CATEGORY |
|---|---|---|---|---|
| 1 | MISSING ACCEPT-LANGUAGE HEADER | THE ACCEPT-LANGUAGE HEADER IS MISSING FROM THE HTTP REQUEST | STATIC, HEADER EXISTENCE, PROTOCOL VERIFICATION | HTTP PROTOCOL ANOMALY |
| 2 | ORIGINATES FROM CLOUD IaaS PROVIDER NETWORK | THE REQUEST ORIGINATED FROM A CLOUD PROVIDER LIKE AZURE OR AMAZON WEB SERVICES, WHERE OPERATORS OFTEN HOST BOTS | DYNAMIC, ASN NUMBERS KEEP CHANGING | CONNECTION, NETWORK SOURCE |
| 3 | MS EDGE SIGNATURE ANOMALY | THE REQUEST USED MISCROSOFT EDGE BUT DETAILS DON'T MATCH TYPICAL EDGE REQUESTS HEADER SIGNATURE MISMATCH FOR MS EDGE | DYNAMIC | BROWSER ANOMALY |

FIG. 2

300 

| KEY | VALUE | DESCRIPTION |
|---|---|---|
| SKA256("GL" "C") | INTERCEPT VALUE | GLOBAL ML MODEL INTERCEPT |
| SHA256("GL" "SCORE") | CUT-OFF SCORE VALUE | GLOBAL ML MODEL CUT-OFF |
| SHA256)"GL" "39004001") ONE PER RULE | COEFFICIENT FOR 390004001 | GLOBAL ML MODEL, 39004001 COEFFICIENT |
| SHA256("ACCOUNT1" "C") | INTERCEPT VALUE | CUSTOMER SPECIFIC ML MODEL INTERCEPT |
| SHA256("ACCOUNT1" "SCORE" | CUT-OFF SCORE VALUE | CUSTOMER SPECIFIC ML MODEL CUT-OFF |
| SHA256("ACCOUNT1" "39004001") ONE PER RULE | COEFFICIENT FOR 390004001 | CUSTOMER ML MODEL, 39004001 COEFFICIENT |

FIG. 3

BROWSER IMPERSONATOR DETECTION (BID) SYSTEM

BACKGROUND OF THE INVENTION

This application relates generally to protecting websites and applications from automated attacks by bots.

Bot detections systems have been used to perform browser impersonation detection (BID). As the name implies, such systems are designed to identify the web traffic originating from a malicious agent impersonating use of a regular browser. Typically, these detections rely on anomaly databases (e.g., TLS hash popularity) in components of a request path to drive their scoring and thus the human/bot decisions. More specifically, anomaly-based detections are techniques that attempt to find an anomaly in various components in the request path that are dissimilar from normal request behavior. Typically, request anomaly detections (also known as transparent detections) match a set of values that are hardcoded. In request anomaly detection systems, typically the scoring models are static, meaning that each rule's score contribution is fixed during development and cannot be modified dynamically. As a result, the impact of adding, deleting or modifying a rule can be unclear, as there is often no automated way to generate weights or to score contributions. Additionally, there may be no established method to continuously evaluate the risks of false positives, or the inclusion of heuristics or algorithms to identify and mitigate these risks.

While browser impersonation detection systems such as described provide significant advantages, there remains a need to improve their operational efficiency, e.g., enhancing the flexible of the system to adapt to changing or new traffic patterns, reducing false positives, and the like.

SUMMARY OF THE INVENTION

A bot detection service is associated with an overlay network (e.g., an edge network) that comprises a set of entities that receive and process request traffic. The bot detection service is configured in software as a control plane, together with a distinct data plane, and wherein the control plane configures the data plane. The data plane operates in an overlay network entity, such as an edge server, a cloud-based virtual machine (VM), or the like, and it includes a set of bot impersonator detection (BID) rules that are applied at runtime (i.e., during the processing of an actual request). The control plane is configured to perform analytics continuously, preferably in an off-line manner (i.e., external to request traffic processing), to generate (i) first data associated with a machine learning model, (ii) second data that defines a set of ground truth device anomaly (DAN) patterns, and (iii) third data for use in tuning the system against false positives (FPs). To program the data plane for bot detection, each of the first, second and third data sets are converted to key-value pairs and output from the control plane to the data plane. To this end, preferably each set of key-value pairs populate a dynamic lookup table (DLT) hosted in the data plane. The DLTs may be updated at any time, thereby providing significant provisioning flexibility for the detection system in the form of updated or new ML model constraints, updated anomaly patterns, up-to-date FP tuning data, and combinations thereof.

During a request processing workflow at the overlay network entity, a request having a set of one or more signals (request path components) is received, and the BID rules and DLTs are used to carry out the browser detection workflow. In an example workflow, a subset of the BID rules that are triggered by the set of one or more signals are first identified. The BID rules may include both static and dynamic rules, and the key-values pairs of the second data set are used to apply any dynamic BID rule. Once the subset of the BID rules are identified, the key-value pairs of the first data set (i.e., of the ML model) are applied to classify the request as a bot or human. When the request is classified as a bot by the machine learning model, the key-value pairs of the third data set are then applied to determine whether to selectively override the bot classification as being a false positive. When the request is classified as a bot and not overridden, a given action is then taken, e.g., denying the request, sandboxing the request, delaying processing of the request, monitoring the request, triggering a firewall action, performing a conditional action on the request, and logging the request.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF DRAWINGS

For a more complete understanding of the subject matter and the advantages thereof, reference is now made to the following descriptions taken in conjunction with the accompanying drawings, in which:

FIG. 2 is a portion of a representative threat signature database comprising a set of BID rules;

FIG. 3 depicts a portion of a representative data set that enables Machine Learning (ML)-based inferencing in the data plane;

DETAILED DESCRIPTION OF THE INVENTION

Figure 1:
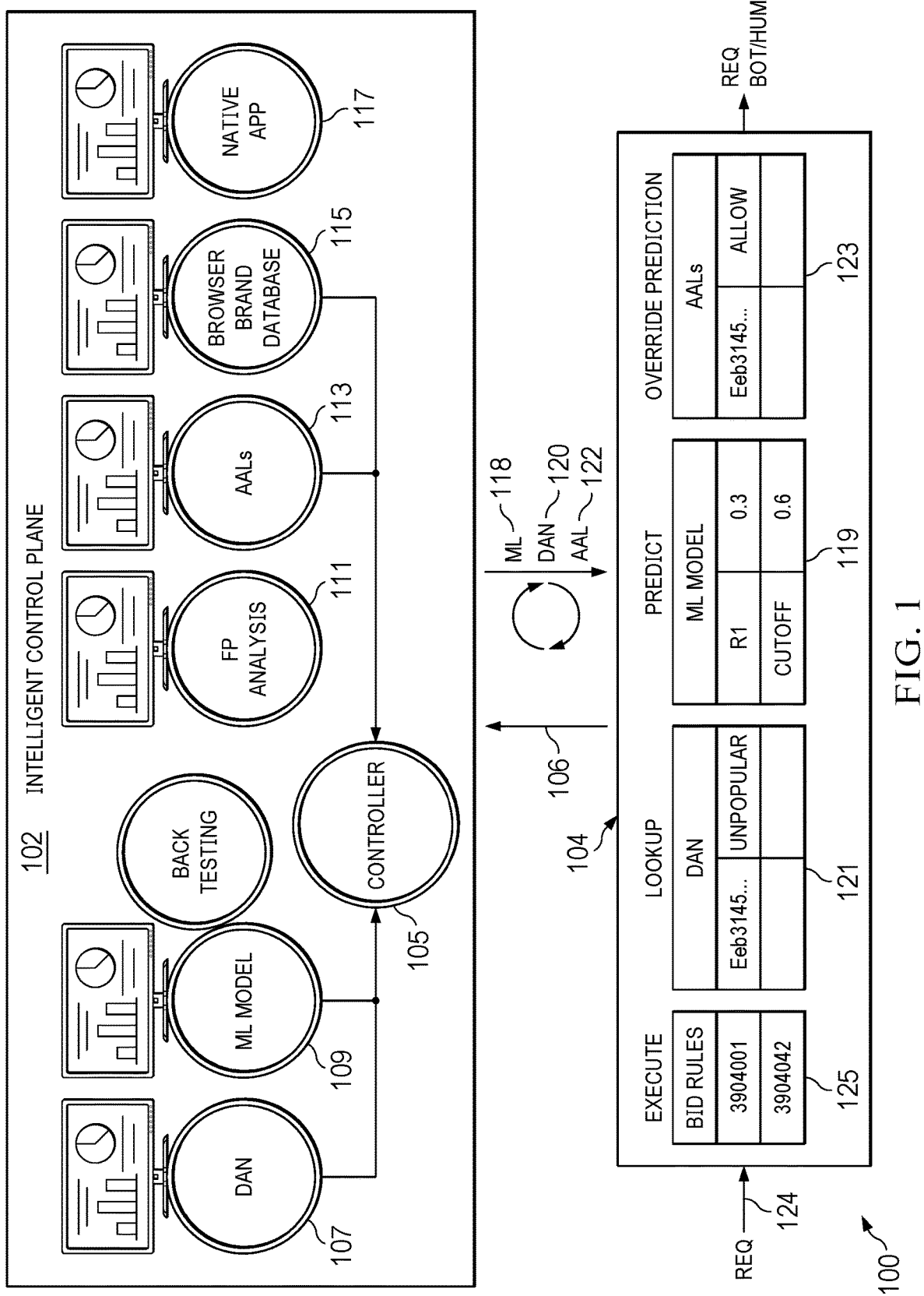
FIG. 1 depicts a representative architecture of the Browser Impersonator Detection (BID) system of this disclosure comprising a control plane, and a data plane.

FIG. 1 depicts a representative Browser Impersonation Detection (BID) system. As noted above, the BID system is used to detect whether a request received at a given computing entity (e.g., a Content Delivery Network (CDN) edge server) is considered to be associated with a human end user or, instead, an automated agent (a bot). In FIG. 1, the BID system 100 comprises two primary elements: a control plane 102, and a data plane 104, each which comprise software executing in computing hardware. The control plane 102 typically operates off-line in the sense of being external to the request processing itself, which processing occurs in the data plane that is hosted in a computing entity, such as an overlay network edge server, a cloud-based virtual machine (VM), or some other security logic. As compared to the machines that host the data plane, the control plane 102 typically is implemented in a centralized manner on a set of computing resources (e.g., in a cloud compute environment) and on behalf of those machines. Thus, there may be many machines (e.g., edge servers) each hosting the data plane (in other words, an instance of the data plane is hosted on or in association with an edge server), and there may be more than one instance of the control plane, which as noted is designed to operate out-of-band with respect to the request processing itself.

In general, and as will be described, the data plane applies a set of BID rules to a request received at the edge server machine and makes a determination regarding whether the request is deemed by the system to be associated with a human being or a bot.

As depicted in FIG. 1, in one embodiment as will be described, the control plane 102 comprises a set of machines, programs, processes, functions, databases and a data architecture that together configure a data plane with device anomaly data, machine learning model data, and FP override data that are used for bot detection. As depicted, the control plane 102 includes a BID Controller 105, a Device Anomaly (DAN) pattern store 107, a Machine Learning (ML) model generation function 109, a False Positive (FP) Analysis function 111, Automated Adaptive List (AAL) store 113, a browser brand database 115, and other support applications 117. Each of these components are described further below.

The DAN pattern store 107 maintains DAN patterns. By way of background, typically, a "rule" is a set of match conditions that match on a signal and its value(s). A "signal" typically corresponds to an element or characteristic of the request or its path, e.g., user-agent header, AS number, IP address, TLS hash, TCP hash, header order, and combinations thereof. A set of signals comprises a device anomaly (DAN) pattern, which sometimes may be characterized as a basis pattern, and a combination pattern. A basis pattern typically is a certain characteristic of a request/device/browser/OS that has cardinality. A combination pattern is a combination (concatenation) of basis patterns, such as DAN #(e.g., canvas fingerprint, certain browser parameters, display dimensions, user agent, TLS hash, header order (which may vary depending on the browser), TCP, H2 hash, font hash, web FL, etc.). Typically, patterns (i.e., sensor data) are collected by JavaScript (JS) at the client, calculated by an edge server, or part of an HTTP request. In a representative embodiment, there are two (2) DAN tables for BID, e.g., web and mobile TLS Hash DAN, although this is not a limitation. The nomenclature "DAN" is not intended to be limiting.

In general, the control plane 102 provides continuous offline analytics for research and discovery of information to enable the system to find, monitor and apply request anomaly detections in a proactive and real-time manner. Specifically, the bifurcated (control plane and data plane) architecture herein facilitates the ability of the system to identify and configure new browser impersonator detections and to continuously program an request processing edge (or other data plane) network with new or updated machine learning (ML) model coefficients, new BID rules, and new signal data, all without requiring modification of the host machine or the data plane codebase. To this end, the control plane 102 receives and leverages various data feeds, including data set 106 from one or more data plane(s) executing in the one or more machines that receive and process the request traffic. The data feeds from the data plane(s) include, for example, request signaling, reporting on the BID rules that have been triggered by those signals, information identifying the resulting bot classification, and the like. The data feeds may also include other data sources available to the detection system, e.g., web application firewall data, other attack traffic data that has been captured and analyzed, and the like. As necessary, data feeds are processed by data processing components, e.g., to provide normalization, filtering, or other desired transformations, with the results of such processing then supplied to the continuous false positive (FP) analysis process 111. The system may also perform false negative (FN) analysis. The process 111 may also receive input, e.g., static rule recommendations and approvals, from DevOps personnel or other automation systems. Using the data 106 and the outputs generated by the continuous FP analysis process 111, a set of model training data is generated. As depicted, the control plane also include the Machine Learning (ML) model generation function 109, which can generate global or "per-customer" ML models. Typically, the training data for a model is derived from the request processing interactions across a set of machines that execute the data plane, and with respect to multiple CDN customers. This is not a requirement, however, as the training data for a particular per customer ML model may be based solely on the request processing data associated just to that customer.

Thus, for example, training data is used to train the per customer ML model. In one example embodiment, the per customer ML model is a logistical regression, although this is not a limitation. The nature and complexity of the ML model may vary. Typically, the ML model is based on a supervised learning approach. As a result of the training, and in the case of a linear ML model, the global or per customer ML model comprises a set of coefficients (in the form of a coefficient vector) that are later useful in the data plane to compute a probability score in the request path. Typically, the size of the coefficient vector corresponds to a number of BID rules that are implemented in the data plane. In addition to the coefficient vector, the ML model (because the model is linear) has an associated intercept value, and a cut-off score that identifies a threshold. When a probability score is above the threshold, a bot is indicated. As used herein, the intercept, the coefficient vector, and the cut-off score comprise a "first" data set 118.

Referring back to FIG. 1, and as noted, in addition to the first data set (for the ML model), the control plane 102 also is responsible for generating and maintaining other data sets, a second data set 120 comprising ground truth device anomaly (DAN) patterns 107, and a third data set 122 comprising false positive (FP) tuning data (derived from the automated adaptive lists or "AALs" 113. In general, the second data set 120 is used to facilitate BID rule analysis during the processing of a request that is received at an edge machine. In particular, the system supports both "static" BID rules, as well as "dynamic" BID rules, where a particular rule is designed to identify a request anomaly. There may be many rules in the rule set, and those rules may be updated by having the control plane update the data plane(s), as will be described in more detail below. The second data set 120 is used for evaluation of the dynamic rules. Further, and generalizing once again, the third data set 122 is used for enabling the data plane to selectively override a prediction made by the ML model. In particular, when the ML model output classifies a request as being associated with a bot, the AALs are applied to determine whether that output should be accepted as such, or whether the bot classification provided by the ML model should be overridden as a false positive. If a bot determination is not then overridden, it is accepted (as being a bot), and then the data plane can take a further action depending on the customer's configuration. This data plane operation is now described in further detail.

In particular, after being generated, each of the first, second and third data sets is programmed into the data plane(s) by the control plane, over an application programming interface (API). A preferred mechanism to accomplish this programming is by having the control plane transform the relevant data set values into "key-value" pairs that are then instantiated in (written to) a data structure in the data plane. Preferably, this data structure is a lookup table. Because the control plane is configured to write the key value pairs of a data set into the lookup table dynamically, the lookup table is sometimes referred to herein as a dynamic lookup table ("DLT"). Preferably, there is a first DLT 119 for the first data (the ML model), a second DLT 121 for the second data (the DAN patterns), and a third DLT 123 for the third data (FP (AAL) override). In a variant embodiment, a single DLT may combine these data sets.

Thus, and according to an aspect of this disclosure, a lookup table (<key, value>) data structure in the edge machine is programmed dynamically by the control plane. It is in this manner that the control plane configures the data plane. As noted above, typically there are three (3) distinct types of data generated by the control plane and written to the data plane, namely, the first, second and third data sets. The application (whether the ML model, the DAN pattern generator, or the FP/FN analytic process) defines the key and value, and preferably the keys and values programmed into the DLTs are transparent to the request processing code in the machine. Further, the architectural approach of using DLTs means that there is no change required to that processing code for each new use case (i.e., a new BID rule) that is implemented by the system.

For the first data set (the ML model), the key-value pairs comprise a key that be either a Rule ID (corresponding to a BID), Intercept, or Cut-Off, while the value contains information about whether the key is enabled and its associated coefficient (if the key is a Rule ID), or more formally: {key: Rule ID|Intercept|cut_off; value: enabled, coefficient}. For the second data set (DAN patterns), a key corresponds to a signal (e.g., TLS hash), and its associated value preferably is a bit string whose individual bits encode characteristics of the signal. For example, and without limitation, the value may comprise four (4) bits "xxxx," with the first and second positions relating to the key and its popularity in web data, and the third and fourth positions providing similar data for mobile data. Thus, DAN pattern DAN #might have a key, e.g., TLS hash, and a value "1100" indicating that, in this particular DAN pattern, the TLS hash is part of a web DAN and is popular, but not part of a mobile DAN. A "0" in the second bit means that the web TLS hash is not commonly used. Without intending to be limiting, DAN values are labeled as popular if their popularity percentage exceeds a given value; otherwise they are tagged as unpopular. A key for a given DAN pattern (Using the second data set, the control plane programs the data plane with the DAN tables (corresponding to various #). Generalizing, a DAN pattern or table is a list of signal values.

As noted above, the third data set comprises Automated Adaptive Lists (AALs) that are created from the FP/FN analysis to selectively override the ML model. Typically, AALs are customer-specific. A representative "key" is a hash, such as "c2ae1cf8e . . . ," with the associated "value" either bot|human (or disallow|allow). The number of AALs per customer may vary. The third data set comprises an aggregate of the per customer AALs, with the key-value pair being determined by the FP/FN analysis application to be a false positive.

Referring now back to FIG. 1, the request processing pipeline in the data plane is now described. This process assumes receipt of the HTTP request 124 in the local machine, e.g., an HTTP (web) proxy hosted in the machine. As noted above, a representative operating environment is a content delivery (or "edge") network in which the machine is an edge server machine and the HTTP proxy provides the HTTP request processing. A representative edge machine architecture is described below. The proxy supports and/or can access locally the set of DLT tables described above, and a set of BID rules 125. During a request processing workflow, the HTTP request 124 having a set of one or more signals (e.g., the request path components) is received, and the BID rules 125 and DLTs (namely, the key-value pairs in ML Model 119, DAN 121 and AALs 123) are used to carry out the browser impersonation detection (BID) workflow.

In an example workflow, a subset of the BID rules that are triggered by the set of one or more signals are first identified. The triggered BID rules may include both static and dynamic rules and, as noted above, the key-values pairs of the second data set (the DAN 127) are used to apply any dynamic BID rule. Once the triggered BID rules are identified, the ML Model data 129 is applied to make the prediction (whether the request is associated with a bot or not). To this end, the coefficients for the triggered rules and intercept are summed, and then a sigmoid function it applied to obtain a probability, using the threshold defined by the ML Model applied as the cut-off. More formally, a BID probability score is obtained as follows. First, a cumulative sum is computed (using the first data set) by adding the Intercept value to a sum of all coefficients of any triggered rule. The probability score is then computed as a Sigmoid (logistic) function=$e^{cumulative\ sum}/(1+e^{cumulative\ sum})$. If the resulting probability score is greater than the model Cut-off, then the request is classified (predicted) as associated with a bot; otherwise, the request is classified as associated with a human. When as a result the request is classified as a bot by the machine learning model, the key-value pairs of the third data set (AALs 123) are then applied to determine whether to selectively override the bot classification as being a false positive. Thus, for example, if the AAL list includes an entry indicating that the system has previously identified an FP for the relevant signaling in the request, the override is enacted, in which case the bot classification is undone. When the request is classified as a bot and not overridden by the AAL, a given action is then taken, e.g., denying the request, sandboxing the request, delaying processing of the request, monitoring the request, performing a conditional action on the request, triggering a given firewall action, and logging the request. The various actions and applicable data are then saved to the machine log.

The nature and scope of the given action typically is specified by a customer in a security policy or other configuration. Similar processing is applied to each HTTP request received at the machine.

Preferably, all three (3) data sets are applied to a given HTTP request, although this is not always required. For example, if there are no dynamic BID rules, the second data set is not applied. Also, if false positives are not a concern for a particular request, there is no need to apply the third data set. Further, and with respect to a given data set, a DLT key may be changed/updated over time, in which case a new data set is then written into the corresponding DLT for use going forward in the HTTP request processing pipeline.

The primary objective of the ML training model is to minimize the number of false positives. Therefore, any new version of the model should demonstrate improved effectiveness as compared to a previous version before deploying it to the data plane. Without intending to be limiting, there may be several different scenarios in which a new ML model is created and deployed, e.g., retraining an existing model by feeding false parameters, tuning the model with hyperparameters, deleting an ineffective rule, adding a new rule, modifying an ineffective rule. In general, a new machine learning model is not deployed to the data plane to replace an existing trained machine learning model prior to training, back-testing (e.g., using live traffic), validating and tuning the second ML model prior to any such promotion. Promoting the new model into the production environment, however, is highly-efficient, as it only requires the control plane to update the first data in the first DLT in the data plane(s).

Typically, the ML model training data includes the false positives from the current ML model. Preferably, the new ML model should learn and adapt, and the newly-trained model should not trigger the same FPs. If the new model does learn FPS, the programmed AAL corresponding to those FPs will become irrelevant and will not be triggered; as a result, the AAL can be purged from the third data set. The irrelevant AALs can be identified by extracting trigger indications (e.g., from browser log data) and aggregating a number of times an AAL is triggered over a given time period (e.g., 24 hours). If the number drops to zero, the AAL can be safely removed from the list.

Preferably, ML training in the control plane is continuous, as is the FP analysis. Further, the programming of the edge machines (or, more generally, the data plane) can occur continuously and without regard to periodic release cycles of the BID rules or the proxy. Indeed, typically one of the first, second and third data sets is being updated continuously in a release cycle that is significantly shorter than the periodic release cycle for the CDN in general. The approach herein ML models and DAN tables to be supported and enforced locally in the request processing pipeline, and it enables new (e.g., dynamic) rules to be implemented at the edge (e.g., by pushing DAN tables or their updates), all at very low operational cost as no changes are required of the edge machine itself. By using the AALs, high or otherwise unacceptable false positives are avoided. Lookups into the DLTs exhibit low latency, and updates to the definitions in those tables can be performed fast, periodically, reliably and safely.

Preferably, DAN table creation, ML model creation and back-testing, FP analysis and AAL generation occur in the control plane as has been described, but one or more of these processes may leverage other processes and data sources or occur elsewhere. As noted, bifurcation of the control processes enables the control plane to program the lightweight data plane, thereby enabling the system to perform the request processing and classification by enabling efficient and reliable matching of incoming requests with the BIDs, application of the ML coefficients to the matched rules, inferencing by comparing the normalized score to configured thresholds, together with selective application of FP overrides to further enhance the accuracy of the prediction.

FIG. 2 depicts a representative "static" BID rule, and a representative "dynamic" BID rule. Each rule is defined in a table 200 by a Rule ID, a Bot Category, a Description, an Approach, and an Anomaly Category. Thus, for example, the static rule (the first row) has a Rule ID of 1, a Bot Category of "Missing Accept-Language Header," the Description "Accept-Language header is missing from the HTTP request," the Approach "Static, Header existence, protocol verification," and the Category "HTTP Protocol Anomaly." HTTP Protocol anomalies include missing headers, irregular headers, and cross-header inconsistencies. In this example, the dynamic rule (the second row) has Rule ID of 2 Bot Category of "Originates from Cloud IaaS Provider Network," the Description "The request originated from a cloud provider, where operators often host bots," the Approach "Dynamic, ASN numbers keep changing," and the Category "Connection, network source." Connection anomalies typically rely on device anomaly databases (e.g., TLS Hash, H2 Hash, or the like). Another dynamic BID rule is shown in the third row, with Rule ID=3, a Bot Category of "MS Edge Signature Anomaly," the Description "The request used Microsoft Edge but details do not match typical Edge requests" the Approach "Dynamic," and the Category "Browser Anomaly." Browser anomalies check for uncommon browser versions or less popular browser versions. Of course, these examples (and the described nomenclature and semantics are not intended to be limiting. Using the techniques herein, the Browser Impersonator Detections adapt to the changing traffic patterns with periodically trained ML models and learning new traffic patterns.

FIG. 3 depicts a representative portion of a first data set. The data is set forth in a table 300 by a Key, a Value and a Description. Thus, for example, the several rows include the representative key-values for a global ML model intercept, cut-off and coefficient vector (for a given BID rule); the next several rows include key-value pairs for a customer-specific model intercept, cut-off and coefficient vector for the given BID rule.

Operating Environment and Enabling Technologies

The following provides a description of an operating environment in which the techniques of this disclosure may be practiced. This operating environment is not intended to be limiting.

Figure 4:
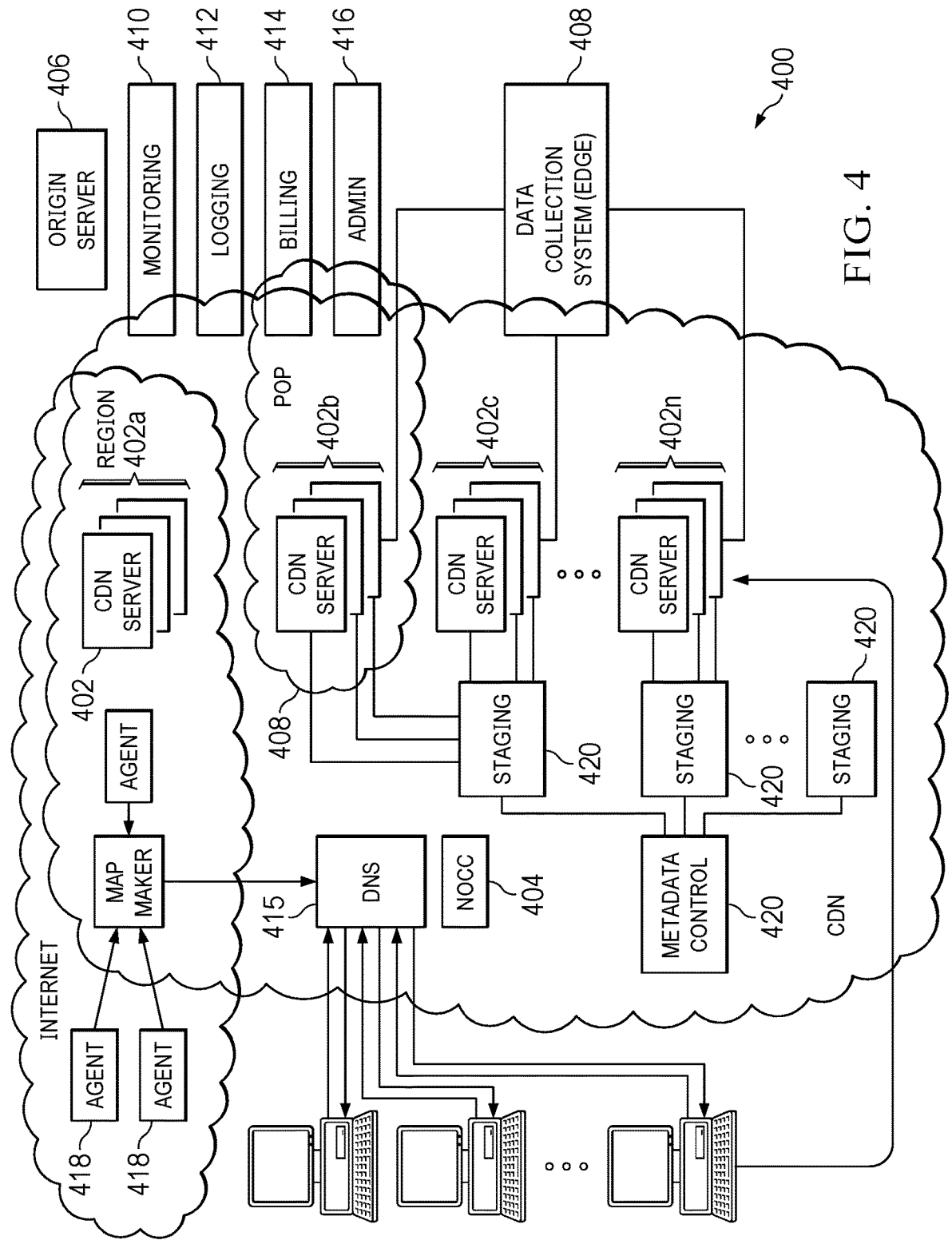
FIG. 4 depicts an overlay network in which the techniques of this disclosure may be practiced.

In a known system, such as shown in FIG. 4, a distributed computer system 400 is configured as a content delivery network (CDN) and is assumed to have a set of machines 402a-n distributed around the Internet. Typically, most of the machines are servers located near the edge of the Internet, i.e., at or adjacent end user access networks. A network operations command center (NOCC) 404 manages operations of the various machines in the system. Third party sites, such as web site 406, offload delivery of content (e.g., HTML, web applications, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 408 that collects usage and other data from the edge servers, aggregates that data across a region or set of regions, and passes that data to other back-end systems 410, 412, 414 and 416 to facilitate monitoring, logging, alerts, billing, management and other operational and administrative functions. Distributed network agents 418 monitor the network as well as the server loads and provide network, traffic and load data to a DNS query handling mechanism 415, which is authoritative for content domains being managed by the CDN. A distributed data transport mechanism 420 may be used to distribute control information (e.g., metadata to manage content, to facilitate load balancing, and the like) to the edge servers.

The data plane as described herein is supported in the machines 402a-n.

Figure 5:
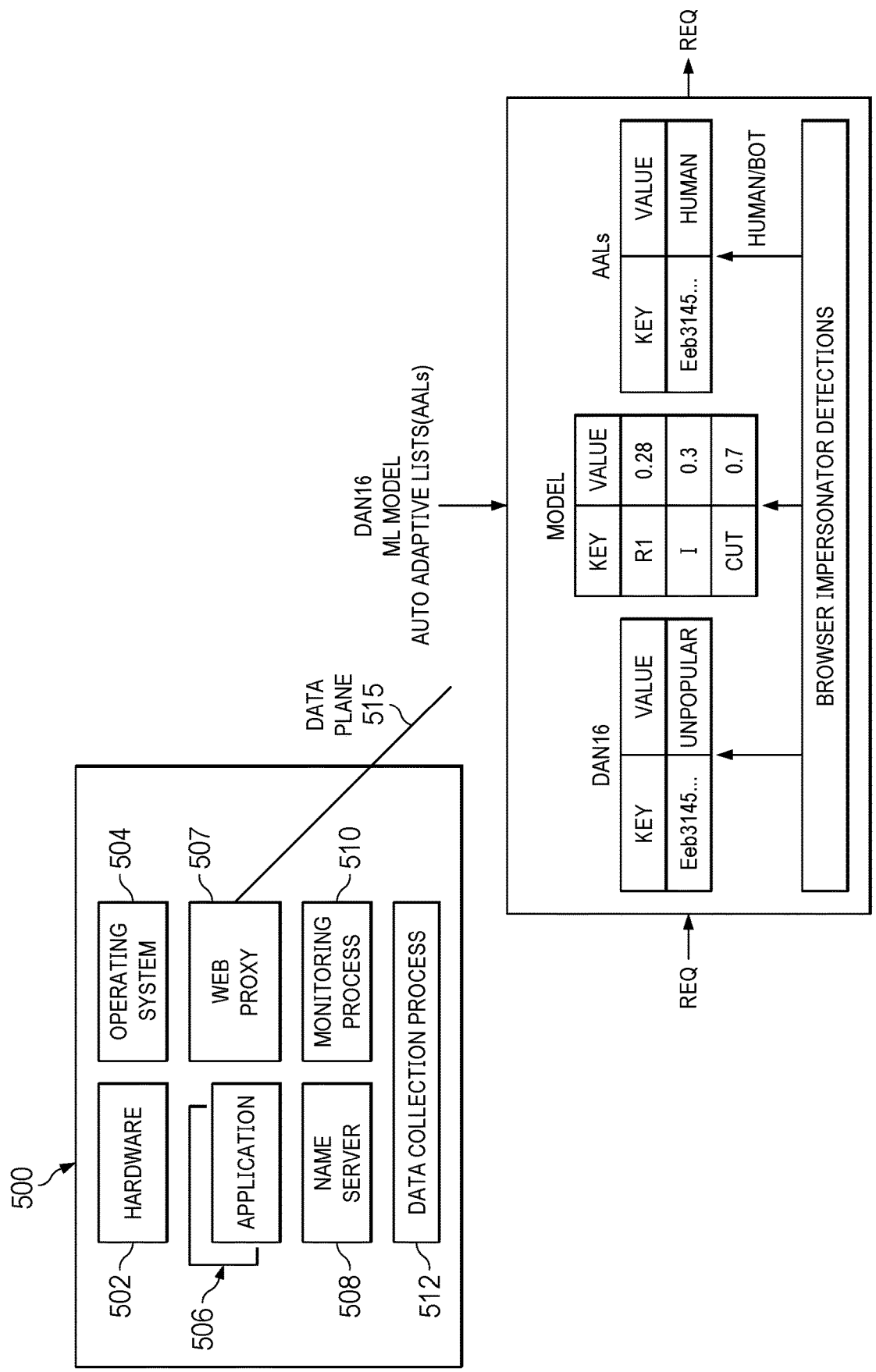
FIG. 5 depicts a representative edge machine of the overlay network that supports the data plane for browser impersonation detection in the HTTP request processing pipeline according to this disclosure.

As illustrated in FIG. 5, a given machine 500 comprises commodity hardware 502 running an operating system kernel (such as Linux) 504 that supports one or more applications 506a-n. To facilitate content delivery services, for example, given machines typically run a set of applications, such as an HTTP proxy 507 (sometimes referred to as a "global host" process), a name server 508, a local monitoring process 510, a distributed data collection process 512, and the like. As depicted, the data plane 515 executes in association with the HTTP proxy request processing flow 507, and the DLTs typically are written to disk and executed in memory.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server. This transport mechanism may also be used to enable the control plane to program the data plane DLTs, as previously described.

The overlay network platform (such as depicted in FIG. 4) comprises the set of distributed technologies that are accessible, e.g., via a customer configuration portal. The customer user, when interacting with the portal, sees new detection methods available in the bot manager detection configuration application and may be requested to specify an endpoint to be protected. The techniques of this disclosure may be provisioned (configured) using the configuration portal.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

The techniques herein may be implemented in a computing platform, such as variously depicted in FIGS. 4-5, although other implementations may be utilized as well. One or more functions of the computing platform (e.g., the control plane) may be implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include Software as a Service (SaaS) (the provider's applications running on cloud infrastructure), Platform as a service (PaaS) (the customer deploys applications that may be created using provider tools onto the cloud infrastructure), and Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines.

Although typically the BID is performed in association with an overlay network such as a CDN, this is not a limitation. In one or more aspects, the control plane or data plane functionality herein also may be implemented in a data center operated by a virtual machine (VM) hosting provider. A representative provider is Linode,® infrastructure-as-a-service available from Akamai Technologies, Inc., of Cambridge, Massachusetts.

As noted above, the techniques herein leverage machine learning (ML) to iteratively learn from the training data. As is well-known, machine learning tasks are typically classified into several categories depending on the nature of the learning signal or feedback available to a learning system: supervised learning, unsupervised learning, and reinforcement learning. In supervised learning, the algorithm trains on labeled historic data and learns general rules that map input to output/target. In particular, the discovery of relationships between the input variables and the label/target variable in supervised learning is done with a training set. The computer/machine learns from the training data. Supervised learning algorithms are Support Vector Machines, Linear Regression, Logistic Regression, Naive Bayes, and Neural Networks. In unsupervised machine learning, the algorithm trains on unlabeled data. In reinforcement learning, the algorithm learns through a feedback system. In the described embodiment, the BID system uses supervised machine learning (namely, a logistical regression) to evolve the rulesets, but this is not a limitation. Unsupervised or reinforcement learning techniques may also be used. In addition, the learning need not be limited to a linear model, as neural networks may also be utilized.

Each above-described process, module or functionality preferably is implemented in computer software as a set of program instructions executable in one or more processors, as a special-purpose machine. GPUs and TPUs may also be leveraged.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

A given implementation of the computing platform is software that executes on a hardware platform running an operating system such as Linux. A machine implementing the techniques herein comprises a hardware processor, and non-transitory computer memory holding computer program instructions that are executed by the processor to perform the above-described methods.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

What is claimed follows below:

1. A method for detecting bots in an edge network comprising entities that receive and process request traffic, comprising:
   configuring a bot detection service as a control plane, and a data plane, the data plane executing in an edge network entity and having associated therewith a set of bot impersonator detection (BID) rules;
   in the control plane, and in one or more off-line processes:
      train a machine learning (ML) model for use in the data plane for bot detection, the trained machine learning model having a first data set comprising an intercept value, a coefficient vector, and a cut-off score;
      generate a second data set comprising one or more device anomaly (DAN) patterns;
      perform an analysis of false positive (FP) data to generate a third data set comprising an FP tuning list;
      configure and output to the data plane the first, second and third data sets as key-value pairs; and
   in the data plane:
      for each of the first, second and third data sets, update a dynamic lookup table (DLT) with the key-value pairs;
      during a request processing workflow, using the DLTs for bot detection by:
         receiving a request having a set of signals;
         applying the set of BID rules to the set of signals with zero or more key-value pairs of the second data set;
         responsive to identifying a subset of the BID rules that are triggered by the set of signals, applying the key-value pairs of the first data set to classify the request as a bot or human;
         selectively overriding a bot classification by the first data set using the key-value pairs of the third data set; and
         taking a given action when the request is classified as a bot and the bot classification is not overridden.

2. The method as described in claim 1, wherein the first, second and third data sets are continuously updated, and each dynamic lookup table is updated accordingly.

3. The method as described in claim 1, wherein an overlay network entity is one of: an edge server, a compute platform virtual machine (VM), and cloud-based generic security logic.

4. The method as described in claim 1, wherein the second data set provides device reputation data.

5. The method as described in claim 1, wherein the machine learning model is a supervised ML model.

6. The method as described in claim 5, wherein the machine learning model is a logistic regression.

7. The method as described in claim 1, further including selectively promoting a second machine learning (ML) model to replace the trained machine learning model, wherein promoting includes training, back-testing, validating and tuning the second ML model prior to promotion.

8. The method as described in claim 1, wherein the BID rules comprise static rules, and dynamic rules, wherein application of a dynamic rule uses the key-value pairs of the second data set for evaluation.

9. The method as described in claim 1, wherein applying the key-value pairs of the first data set comprises:
   computing a cumulative sum by adding an intercept value to a sum of coefficients of the coefficient vector for any triggered BID rule;
   computing a probability score as $e^{cumulative\ sum}/(1+e^{cumulative\ sum})$;
   determining if the probability score is greater than the cut-off score; and
   classifying the request as a bot when the probability score is greater than the cut-off score.

10. The method as described in claim 1, further including updating the key-value pairs BID rules in the data plane.

11. The method as described in claim 10, wherein the BID rules in the data plane are updated in a periodic release cycle.

12. The method as described in claim 11, wherein the first, second and third data sets are updated continuously in a release cycle that is shorter than the periodic release cycle.

13. The method as described in claim 1, wherein the DAN data sets are generated in the control plane based at least in part on signals received from data planes operating in the overlay network entities.

14. The method as described in claim 1, wherein the FP tuning list is generated in the control plane based at least in part on analyzing FP signals received from data planes operating in the overlay network entities.

15. The method as described in claim 1, wherein the given action is one of: denying the request, sandboxing the request, delaying processing of the request, monitoring the request, performing a conditional action on the request, and logging the request.

* * * * *